(12) United States Patent
Kato

(10) Patent No.: US 10,971,707 B2
(45) Date of Patent: Apr. 6, 2021

(54) LAMINATED ALL-SOLID-STATE BATTERY INCLUDING A FILLER

(71) Applicant: TOYOTA JIDOSHA KABUSHIKI KAISHA, Toyota (JP)

(72) Inventor: Kazuhito Kato, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/869,392

(22) Filed: Jan. 12, 2018

(65) Prior Publication Data

US 2018/0233711 A1 Aug. 16, 2018

(30) Foreign Application Priority Data

Feb. 14, 2017 (JP) .............................. JP2017-025247

(51) Int. Cl.
| | |
|---|---|
| *H01M 2/02* | (2006.01) |
| *H01M 10/0562* | (2010.01) |
| *H01M 10/052* | (2010.01) |
| *H01M 4/66* | (2006.01) |
| *H01M 10/0585* | (2010.01) |
| *H01M 4/62* | (2006.01) |

(52) U.S. Cl.
CPC ....... *H01M 2/0277* (2013.01); *H01M 2/0285* (2013.01); *H01M 2/0287* (2013.01); *H01M 4/66* (2013.01); *H01M 10/052* (2013.01); *H01M 10/0562* (2013.01); *H01M 10/0585* (2013.01); *C08J 2300/22* (2013.01); *C08J 2300/24* (2013.01); *H01M 4/622* (2013.01)

(58) Field of Classification Search
None
See application file for complete search history.

(56) References Cited

U.S. PATENT DOCUMENTS

| | | | |
|---|---|---|---|
| 2004/0067417 A1 | 4/2004 | Oosawa et al. | |
| 2008/0281037 A1* | 11/2008 | Karjala | C08F 210/16 524/571 |
| 2012/0216394 A1 | 8/2012 | Kitaura et al. | |
| 2012/0219874 A1* | 8/2012 | Suzuki | H01M 8/0286 429/480 |

(Continued)

FOREIGN PATENT DOCUMENTS

| | | | | |
|---|---|---|---|---|
| JP | 200149200 | * | 8/1999 | ................ C09J 4/06 |
| JP | 2001-325945 | * | 11/2001 | .............. H01M 2/34 |

(Continued)

*Primary Examiner* — Amanda J Barrow
(74) *Attorney, Agent, or Firm* — Sughrue Mion, PLLC

(57) ABSTRACT

A method for producing a laminated all-solid-state battery 100, including: housing an all-solid-state battery laminate 15, having one or more all-solid-state unit cells, in a casing 20 composed of a laminated film 21, the one or more all-solid-state unit cells obtained by laminating a negative electrode current collector layer having a negative electrode current collector tab 1a, a negative electrode active material layer, a solid electrolyte layer, a positive electrode active material layer and a positive electrode current collector layer having a positive electrode current collector tab 5a in this order, pressing the all-solid-state battery laminate 15 housed in the casing 20 in the direction of lamination from outside the casing 20, injecting a filler into the casing 20 while maintaining pressure, and sealing the casing 20.

7 Claims, 2 Drawing Sheets

(56) References Cited

U.S. PATENT DOCUMENTS

| | | | | |
|---|---|---|---|---|
| 2013/0157111 A1* | 6/2013 | Chami | ................ | H01M 2/0275 |
| | | | | 429/157 |
| 2014/0170470 A1* | 6/2014 | Jeong | .................. | H01M 2/0212 |
| | | | | 429/163 |
| 2015/0270585 A1 | 9/2015 | Sasaoka et al. | | |
| 2016/0285120 A1* | 9/2016 | Nakano | ...................... | C09J 5/00 |
| 2016/0380141 A1* | 12/2016 | Nakagawa | .......... | H01L 31/0504 |
| | | | | 136/246 |
| 2018/0212210 A1* | 7/2018 | Suzuki | ................ | H01M 2/0285 |
| 2018/0342710 A1* | 11/2018 | Yoon | ................... | H01M 2/0277 |
| 2019/0157648 A1* | 5/2019 | Yeo | ..................... | H01M 4/0404 |

FOREIGN PATENT DOCUMENTS

| | | | | |
|---|---|---|---|---|
| JP | 2001-325945 A | 11/2001 | | |
| JP | 2004-022208 A | 1/2004 | | |
| JP | 2004-134116 A | 4/2004 | | |
| JP | 2008-103288 | * | 5/2008 | ............. H01M 2/02 |
| JP | 2008-103288 A | 5/2008 | | |
| JP | 2008-140633 A | 6/2008 | | |
| JP | 2015-076272 | * | 4/2015 | ......... H01M 20/058 |
| JP | 2015-519703 A | 7/2015 | | |
| JP | 2015-179566 A | 10/2015 | | |
| KR | 2015102551 | * | 9/2015 | ............ C09J 133/04 |
| WO | 2011/052094 A1 | 5/2011 | | |
| WO | 2013/018196 A1 | 2/2013 | | |

* cited by examiner

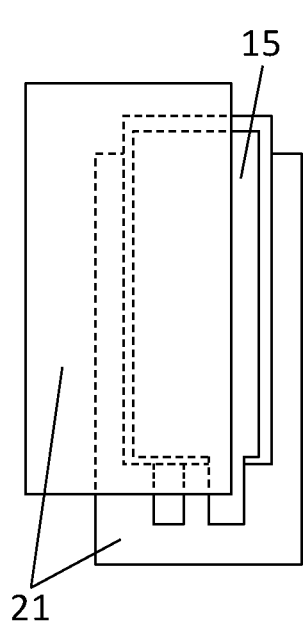 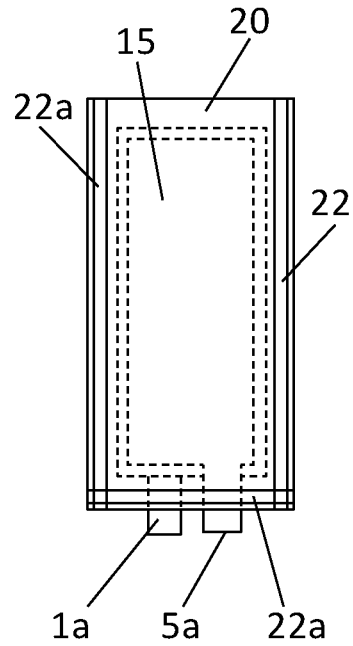 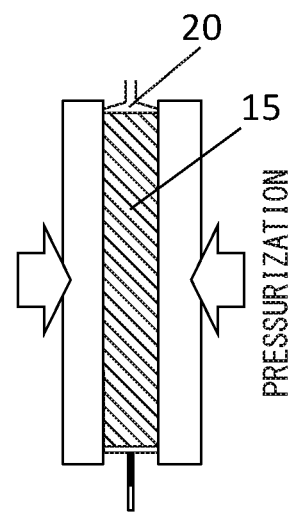
FIG.2(a)    FIG.2(b)    FIG.2(c)
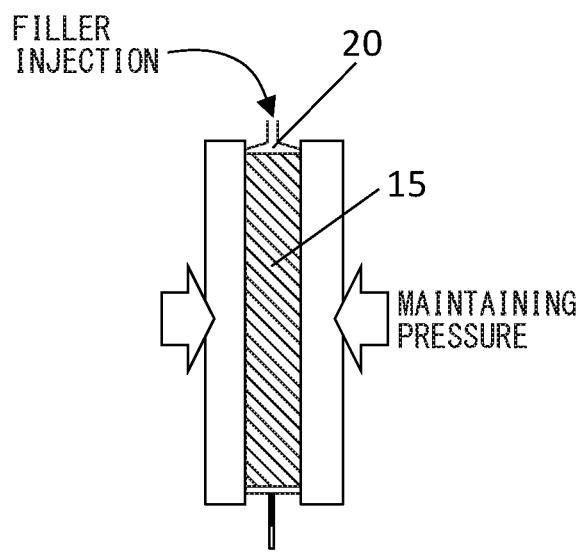 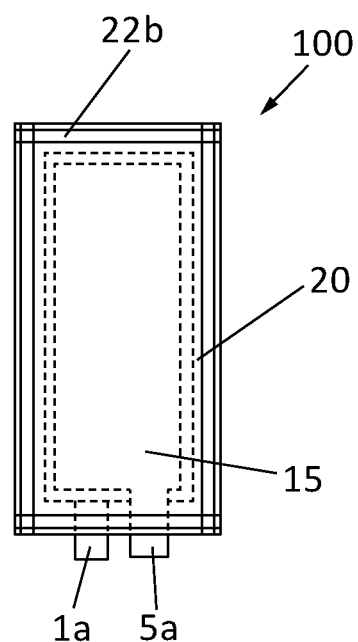
FIG.2(d)    FIG.2(e)

LAMINATED ALL-SOLID-STATE BATTERY INCLUDING A FILLER

TECHNICAL FIELD

The present invention relates to a method for producing a laminated all-solid-state battery.

BACKGROUND ART

Laminated batteries are known to have a plurality of power generation elements sealed in a laminated film and to be used as lightweight batteries capable of demonstrating high levels of energy density and output density.

For example, Patent Document 1 describes a battery pack that houses power generation elements, obtained by laminating or winding a positive electrode plate, separator and negative electrode plate, in a laminated film casing obtained by compounding a polymer and metal. This Patent Document 1 further describes that a solid electrolyte can be applied to the prescribed battery of this patent document, and that a vacuum can be drawn prior to sealing and after having inserted the power generation elements in the laminated film.

Patent Document 2 relates to an all-solid-state battery obtained by covering all-solid-state battery elements with a casing composed of thermoplastic resin or thermosetting resin. Examples of Patent Document 2 describes an example in which the all-solid-state battery elements are covered with a polybutadiene resin composition followed by housing in a laminated film.

Patent Document 3 relates to a bipolar battery provided with an insulating layer on the surface of a foil current collector. A structure in which the insulating layer protrudes lengthwise outside the foil current collector by the width of a single cell, and a structure further having a different insulating layer that covers the edge of each electrode, are described as examples of an embodiment of this patent document.

PRIOR ART DOCUMENTS

Patent Documents

[Patent Document 1] Japanese Unexamined Patent Publication No. 2004-022208
[Patent Document 2] Japanese Unexamined Patent Publication No. 2008-103288
[Patent Document 3] Japanese Unexamined Patent Publication No. 2004-134116

BEST MODE FOR CARRYING OUT THE INVENTION

Problems to be Solved by the Invention

According to the art described in Patent Document 1, there are cases in which short-circuiting occurs due to deformation of the edges of power generation elements when the power generation elements, which are typically in the form of an all-solid-state battery laminate, are vacuum-sealed in a laminated film.

Deformation of the edges of the all-solid state battery laminate and short-circuiting attributable thereto are thought to be able to be prevented when the art of Patent Documents 2 and 3 is applied to the battery pack of Patent Document 1. However, the battery of Patent Document 2, in which all of the all-solid-state battery elements are covered with resin, and the battery of Patent Document 3, provided with an insulator layer or plurality of insulator layers having a structure that protrudes lengthwise, are disadvantageous in terms of battery performance per volume since the volume of constituents other than those elements contributing to power generation accounts for a comparatively large proportion of the total volume of the battery.

With the foregoing in view, an object of the present invention is to provide a method for producing a laminated all-solid-state battery that demonstrates superior battery performance per volume without causing deformation of the edges in the planar direction of an all-solid-state battery laminate during the production process.

Another object of the present invention is to provide a laminated all-solid-state battery that demonstrates superior battery performance per volume without causing deformation of the edges in the planar direction of an all-solid-state battery laminate.

Means for Solving the Problems

The present invention is as indicated below.

[1] A method for producing a laminated all-solid-state battery, including:
housing an all-solid-state battery laminate, having one or more all-solid-state unit cells, in a casing composed of a laminated film, the one or more all-solid-state unit cells being obtained by laminating a negative electrode current collector layer having a negative electrode current collector tab, a negative electrode active material layer, a solid electrolyte layer, a positive electrode active material layer and a positive electrode current collector layer having a positive electrode current collector tab in this order;
pressing the all-solid-state battery laminate housed in the casing in the direction of lamination from outside the casing;
injecting a filler into the casing while maintaining pressure; and
sealing the casing.

[2] The method described in [1], wherein the filler is a thermosetting resin, and
wherein the method further includes curing the filler injected into the casing after injecting the filler into the casing, and before or after sealing the casing.

[3] The method described in [2], wherein the viscosity of the filler after curing is 100,000 cps or more.

[4] The method described in [2] or [3], wherein the viscosity of the filler after curing is 300,000 cps or less.

[5] The method described in any of [1] to [4], wherein the filler is selected from the group consisting of a two-component curable resin, thermosetting resin and polymer gel.

[6] The method described in any of [1] to [5], wherein the laminated film is a resin-laminated metal foil having a resin film on one or both sides of a metal foil.

[7] A laminated all-solid-state battery,
wherein the battery including the followings, which are housed in a casing composed of a laminated film:
an all-solid-state battery laminate, having one or more all-solid-state unit cells obtained by laminating a negative electrode current collector layer having a negative electrode current collector tab, a negative electrode active material layer, a solid electrolyte layer, a positive electrode active material layer and a positive electrode current collector layer having a positive electrode current collector tab in this order, and
a filler;

wherein the filler is present between the edges in the planar direction of the all-solid-state battery laminate and the laminated film; and wherein the all-solid-state battery laminate contacts the laminated film in the direction of lamination.

[8] The all-solid-state battery described in [7], wherein the viscosity of the filler is 100,000 cps or more.

[9] The all-solid-state battery described in [7] or [8], wherein the viscosity of the filler is 300,000 or less.

[10] The all-solid-state battery described in any of [7] to [9], wherein the filler is selected from the group consisting of a two-component curable resin, thermosetting resin and polymer gel.

[11] The all-solid-state battery described in any of [7] to [10], wherein the laminated film is a resin-laminated metal foil having a resin film on one or both sides of a metal foil.

Effects of the Invention

According to the present invention, a method is provided for producing a laminated all-solid-state battery that demonstrates superior battery performance per volume and in which deformation of the edges in the planar direction of an all-solid-state battery laminate is inhibited in the production process and usage stage.

According to the present invention, a laminated all-solid-state battery is further provided that demonstrates superior battery performance per volume and in which deformation of the edges in the planar direction of an all-solid-state battery laminate is inhibited.

BRIEF DESCRIPTION OF THE DRAWINGS

FIGS. 2(a)-2(e) are schematic diagrams for explaining the method for producing a laminated all-solid-state battery of the present invention.

BEST MODE FOR CARRYING OUT THE INVENTION

Figure 1A:
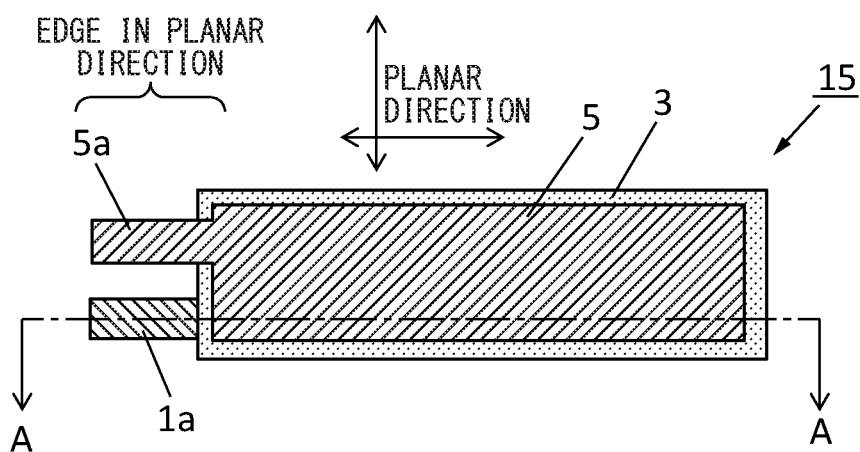
FIGS. 1(a)-1(b) are schematic diagrams showing one example of an all-solid-state battery laminate in the laminated all-solid-state battery of the present invention.

The method for producing a laminated all-solid-state battery of the present invention includes:

housing an all-solid-state battery laminate, having one or more all-solid-state unit cells in a casing composed of a laminated film (housing step), the one or more all-solid-state unit cells being obtained by laminating a negative electrode current collector layer having a negative electrode current collector tab, a negative electrode active material layer, a solid electrolyte layer, a positive electrode active material layer and a positive electrode current collector layer having a positive electrode current collector tab in this order;

pressing the all-solid-state battery laminate housed in the casing in the direction of lamination from outside the casing (pressurization step);

injecting a filler into the casing while maintaining pressure (filler injection step); and sealing the casing (sealing step).

In the present invention, an all-solid-state battery laminate is housed in a casing followed by injecting a filler into the casing while pressing the all-solid-state battery laminate in the direction of lamination from outside the casing, and then sealing the filler therein.

As a result of going through such a process, the laminated all-solid-state battery is such that the edges in the planar direction of the all-solid-state battery laminate are protected by a filler present between the edges in the planar direction of the laminate and the laminated film. Consequently, even in the case of having sealed the casing while drawing a vacuum within the casing, deformation of the edges in the planar direction of the all-solid-state battery laminate is inhibited and short-circuiting can be prevented.

The "edges in the planar direction of the all-solid-state battery laminate" refer to areas in the vicinity of the negative electrode current collector tab and positive electrode current collector tab in particular.

The following provides an explanation of examples of an all-solid-state battery laminate and casing preferably used in the present embodiment followed by an explanation focusing primarily on a preferred embodiment of the method for producing a laminated all-solid-state battery of the present invention.

<All-Solid-State Battery Laminate>

The all-solid-state battery laminate in the present embodiment includes one or more all-solid-state unit cells obtained by laminating a negative electrode current collector layer having a negative electrode current collector tab, a negative electrode active material layer, a solid electrolyte layer, a positive electrode active material layer and a positive electrode current collector layer having a positive electrode current collector tab in this order.

In the case the all-solid-state battery laminate contains two or more all-solid-state unit cells, the order in which each layer is laminated in adjacent all-solid-state unit cells may be the same order or opposite order in the direction of lamination. In the case the all-solid-state battery laminate contains two or more all-solid-state unit cells, adjacent all-solid-state unit cells may be composed to share the same positive electrode current collector layer or negative electrode current collector layer.

The all-solid-state battery laminate may have:

two all-solid state unit cells laminated in the same order, in which for example the negative electrode current collector layer, negative electrode active material layer, solid electrolyte layer, positive electrode active material layer, positive electrode current collector layer, negative electrode current collector layer, negative electrode active material layer, solid electrolyte layer, positive electrode active material layer and positive electrode current collector layer are laminated in this order, or two all-solid-state unit cells laminated in the opposite order, in which for example, the negative electrode current collector, negative electrode active material layer, solid electrolyte layer, positive electrode active material layer, positive electrode current collector layer, positive electrode active material layer, solid electrolyte layer, negative electrode active material layer and negative electrode current collector layer are laminated in this order, while sharing a positive electrode current collector layer.

Figure 1B:
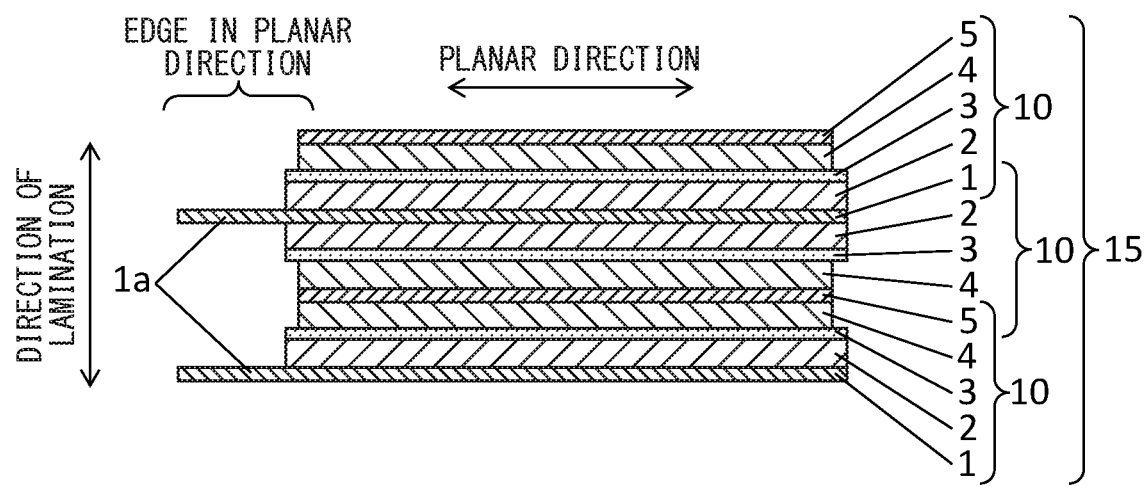

FIG. 1 shows an example of an all-solid-state battery laminate 15 in the present embodiment. FIG. 1(a) is an overhead view while FIG. 1(b) is a cross-sectional view taken along line A-A of FIG. 1(a).

The all-solid-state battery laminate 15 has three all-solid-state unit cells 10, in which a negative electrode current collector layer 1 having a negative electrode current collector tab 1a, a negative electrode active material layer 2, a solid electrolyte layer 3, a positive electrode active material layer 4, and a positive electrode current collector layer 5 having a positive electrode current collector tab 5a are laminated in this order, while sharing the negative electrode current collector layer 1 and the positive electrode current collector layer 5 and being laminated in the opposite order. The negative electrode current collector tab 1a and the positive electrode current collector tab 5a are respectively protruding from the negative electrode current collector layer 1 and the positive electrode current collector layer 5 in the planar direction. The sizes of the three layers consisting of the negative electrode current collector layer 1, the negative electrode active material layer 2 and the solid electrolyte layer 3 are larger in the planar direction than the positive electrode active material layer 4 and the positive electrode current collector layer 5.

In the all-solid-state battery laminate 15 shown in FIGS. 1(*a*) and 1(*b*), the areas in the vicinity of the negative electrode current collector tab 1a and the positive electrode current collector tab 5a are the edges in the planar direction of the all-solid-state battery laminate 15 that are protected according to the present embodiment in particular. As illustrated, the edges in the planar direction encompass the negative electrode current collector tab 1a and the positive electrode current collector tab 5a.

<Casing>

The casing in the laminated all-solid-state battery of the present embodiment may be a resin-laminated metal foil having a resin film on one side or both sides of a metal foil. A typical example thereof consists of a resin-laminated metal foil having a configuration consisting of laminating a resin film on one side of the metal foil for the purpose of imparting mechanical strength, and laminating a resin film having heat sealability on the opposite side thereof.

The metal foil in the resin-laminated metal foil may be a foil composed of, for example, aluminum or an aluminum alloy. The resin film for imparting mechanical strength may be a film composed of, for example, polyester or nylon. The film having heat sealability may be a film composed of, for example, polyolefin, and more specifically, a film composed of, for example, polyethylene or polypropylene.

The laminated film that composes the casing in the present embodiment may be that which has been embossed on one side or both sides thereof.

<Method for Producing Laminated all-Solid-State Battery>

The following provides an explanation of the method for producing a laminated all-solid-state battery of the present embodiment using as an example the case in which the all-solid-state battery and casing respectively employ the aforementioned preferable configurations.

[Housing Step]

The housing step in the present embodiment is a step for housing an all-solid-state battery laminate, having one or more all-solid-state unit cells obtained by laminating a negative electrode current collector layer having a negative electrode current collector tab, a negative electrode active material layer, a solid electrolyte layer, a positive electrode active material layer and a positive electrode current collector layer having a positive electrode current collector tab in this order, in a casing composed of a laminated film.

FIGS. 2(*a*) and 2(*b*) show an example of the case of using a resin-laminated metal foil for the laminated film.

Two laminated films 21 are mutually opposed so that the resin film having heat sealability is on the inside, and the all-solid-state battery laminate 15 is arranged in the void there between (FIG. 2(*a*)). Among the four outer peripheral sides of the laminated film 21, the side on which the negative electrode current collector tab 1a and the positive electrode current collector tab 5a protrude along with the two sides adjacent thereto are sealed with heat seals 22a to form the pouch-like casing 20 (FIG. 2(*b*)). As a result, the all-solid-state battery laminate is housed within the casing 20 composed of a laminated film.

[Pressurization Step]

Next, the all-solid-state battery laminate 15 housed in the casing 20 is pressed in the direction of lamination from outside the casing 20 in the pressurization step (FIG. 2(*c*)). As a result of applying pressure at this time, uniform pressure may be applied over the entire surface of the all-solid-state battery laminate 15 in the planar direction. Pressure may be applied using a suitable method such as the use of mechanical pressure or gas pressure.

An example of a method that uses mechanical pressure may be a method of converting the driving of a motor into pressure in the direction of lamination of the all-solid-state battery laminate by means of a ball screw or hydraulic pressure, and applying pressure with this pressure. An example of a method that uses gas pressure may be a method of applying pressure in the direction of lamination of the all-solid-state battery laminate with pressurized gas filled into a gas cylinder.

The pressure applied in the pressurization step is only required to be larger than the injection pressure of the filler in the filler injection step to be subsequently described. The pressure applied in the pressurization step may be, for example, 1 MPa or more, 5 MPa or more, 10 MPa or more or 15 MPa or more, or for example, 45 MPa or less, 40 MPa or less, 35 MPa or less or 30 MPa or less.

[Filler Injection Step]

In the filler injection step, a filler is injected into the casing 20 while maintaining the pressure applied in the aforementioned pressurization step (FIG. 2(*d*)). A known resin material can be preferably used as a filler.

A filler not having excessively high viscosity during injection may be selected for use as the filler used in the present embodiment in order to facilitate injection in the filler injection step and enable the filler to reach the edges in the planar direction, that should be protected of the all-solid-state battery laminate. The viscosity of the filler during injection at 25° C., for example, may be 200 cps or less, 150 cps or less, 100 cps or less, 50 cps or less, 30 cps or less or 20 cps or less.

However, the viscosity of the filler during the sealing step is preferably significantly high from the viewpoint of effectively protecting the edges in the planar direction of the all-solid-state battery laminate when a vacuum is preferably drawn during the sealing step. From this viewpoint, the viscosity of the filler during the sealing step at 25° C., for example, may be 100,000 cps or more, 150,000 cps or more or 200,000 cps or more.

The laminated all-solid-state battery of the present embodiment may also undergo a change in volume of the all-solid-state battery laminate accompanying charging and discharging. The filler preferably has a certain degree of fluidity in order to accommodate this change in volume and further enhance the durability of the laminated all-solid-state battery. From this viewpoint, the viscosity of the filler at 25° C., for example, during use of the laminated all-solid-state battery may be 300,000 cps or less, 250,000 cps or less or 200,000 cps or less.

As has been described above, the filler in the present embodiment may be a thermosetting resin that has low viscosity at 25° C., for example, of 200 cps or less when injected in the filler injection step, and is capable of having high viscosity at 25° C., for example, of 100,000 cps to 300,000 cps during the sealing step and during use.

A curable resin selected from among, for example, a two-component curable resin, thermosetting resin or polymer gel may be used as a filler in the present embodiment. Examples of two-component curable resins used may include two-component epoxy curable resins, and silicone gel manufactured by Shin-Etsu Chemical Co., Ltd. under the brand name "Shin-Etsu Silicone". Examples of thermosetting resins used may include Technomelt Supra 481 Cool manufactured by Henkel AG & Co. Examples of polymer gels used may include compositions composed of toluene and a crosslinking agent.

In the case of using a curable resin as described above for the filler used in the present embodiment, a curing step for curing the injected filler may be carried out following the filler injection step. This curing step may be suitably carried out corresponding to the type of curable resin used. The curing step may be carried out by, for example, heating or allowing to stand undisturbed at room temperature.

[Sealing Step]

Finally, the laminated all-solid-state battery 100 of the present embodiment can be obtained by sealing the casing 20 in the sealing step.

Sealing of the casing 20 may be carried out on the remaining side among the four outer peripheral sides of the laminated film that was not sealed in the housing step with, for example, a heat seal 22b.

When sealing the casing 20, sealing may be carried out while drawing a vacuum inside the casing 20.

<Laminated all-Solid-State Battery>

The laminated all-solid-state battery of the present embodiment produced according to a method as described above
wherein the battery includes the followings, which are housed in a casing composed of a laminated film:
an all-solid-state battery laminate, having one or more unit cells obtained by laminating a negative electrode current collector layer having a negative electrode current collector tab, a negative electrode active material layer, a solid electrolyte layer, a positive electrode active material layer and a positive electrode current collector layer having a positive electrode current collector tab in this order, and
a filler;
wherein the filler is present between the edges in the planar direction of the all-solid-state battery laminate and the laminated film; and
wherein all-solid-state battery laminate contacts the laminated film in the direction of lamination.

In the laminated all-solid-state battery of the present embodiment, the areas of the edges in the planar direction of the laminate are protected, since the filler is present between the edges in the planar direction of the all-solid-state battery laminate and the laminated film. Thus, damage to the areas of the edges, and particularly the current collector tabs, is highly inhibited during use of the battery.

The laminated all-solid-state battery of the present embodiment further contacts the laminated film in the direction of lamination of the all-solid-state battery laminate. This means that excess filler is not present between the outermost layer in the direction of lamination of the laminate and the laminated film. Thus, this type of laminated all-solid-state battery demonstrates superior performance per volume since it employs a structure in which superfluous volume not contributing to the battery reaction is reduced.

The laminated all-solid-state battery of the present embodiment may be provided for use in a state in which the all-solid-state battery laminate is constrained by being pressed in the direction of lamination thereof from outside the casing. The constraint pressure in this case may be, for example, greater than 0 MPa to 0.1 MPa or more, 0.2 MPa or more, 0.3 MPa or more or 0.4 MPa or more, and for example, 1 MPa or less, 0.9 MPa or less, 0.8 MPa or less or 0.7 MPa or less.

<Constituent Materials of Each Element of Laminated all-Solid-State Battery>

The following provides an explanation of materials that compose elements of the laminated all-solid-state battery of the present embodiment other than the previously explained casing and filler.

[Negative Electrode Current Collector Layer]

Examples of materials that can be used to compose the negative electrode current collector layer in the laminated all-solid-state battery of the present embodiment include foils made of SUS, Cu, Ni, Fe, Ti, Co or Zn.

[Negative Electrode Active Material Layer]

The negative electrode active material at least contains a negative electrode active material, and examples thereof that can be suitably used include known negative electrode active materials such as graphite.

An sulfide-based solid electrolyte can be preferably used for the solid electrolyte in the negative electrode active material layer, specific examples of which include mixtures of $Li_2S$ and $P_2S_5$ (in which the mixing weight ratio of $Li_2S:P_2S_5$ is 50:50 to 100:0 and particularly preferably 70:30).

A fluorine atom-containing resin typically represented by polyvinylidene fluoride (PVDF), for example, can be used as a binder in the negative electrode active material layer.

Examples of the electrically conductive material in the negative electrode active material layer include known electrically conductive materials such as carbon nanofibers (such as VGCF manufactured by Showa Denko K. K.) or acetylene black.

[Solid Electrolyte Layer]

The solid electrolyte layer at least contains a solid electrolyte and preferably further contains a binder.

A previously described material able to be used as a solid electrolyte in the negative electrode active material layer can be used for the solid electrolyte in the solid electrolyte layer.

Butadiene rubber (BR) is preferable for the binder in the solid electrolyte layer.

[Positive Electrode Active Material Layer]

The positive electrode active material layer at least contains a positive electrode active material, and preferably further contains a solid electrolyte, binder and electrically conductive material.

A known positive electrode active material such as lithium cobaltate, for example, can be suitably used for the aforementioned positive electrode active material.

Materials previously described as being able to be used in the negative electrode active material layer can be suitably used for the solid electrolyte, binder and electrically conductive material, respectively, in the positive electrode active material layer.

[Positive Electrode Current Collector Layer]

Examples of materials that can be used to compose the positive electrode current collector layer include foils made of stainless steel (SUS), Ni, Cr, Au, Pt, Al, Fe, Ti or Zn.

BRIEF DESCRIPTION OF THE REFERENCE SYMBOLS

1 Negative electrode current collector layer
1a Negative electrode current collector tab
2 Negative electrode active material layer 3 Solid electrolyte layer
4 Positive electrode active material layer
5 Positive electrode current collector layer
5a Positive electrode current collector tab
10 All-solid-state unit cell
15 All-solid state battery laminate
20 Casing
21 Laminated film
22a Heat seal
22b Heat seal
100 Laminated all-solid-state battery

The invention claimed is:

1. A laminated all-solid-state battery, comprising:
a casing composed of a laminated film;
an all-solid-state battery laminate housed in the casing, having a plurality of all-solid-state unit cells, wherein each all-solid-state unit cell is obtained by laminating a negative electrode current collector layer having a negative electrode current collector tab, a negative electrode active material layer, a solid electrolyte layer, a positive electrode active material layer and a positive electrode current collector layer having a positive electrode current collector tab in this order,
wherein the all-solid-state battery laminate includes edges in a planar direction, wherein the edges in the planar direction encompass: the negative electrode current collector tabs and the positive electrode current collector tabs, and edges of the negative electrode current collector layers, the negative electrode active material layers, the solid electrolyte layers, the positive electrode active material layers and the positive electrode current collector layers,
an injectable filler housed in the casing;
wherein the injectable filler is configured to reach the edges in the planar direction so as to be located between the edges in the planar direction of the all-solid-state battery laminate and the laminated film and the injectable filler is configured to inhibit deformation of the edges in the planar direction; and
wherein the all-solid-state battery laminate contacts the laminated film in a direction of lamination, and
wherein a viscosity, after curing, of the injectable filler is 100,000 cps-300,000 cps at a temperature of 25° C. during use of the all-solid-state battery.

2. The all-solid-state battery according to claim 1, wherein the injectable filler is selected from the group consisting of a two-component curable resin, thermosetting resin and polymer gel.

3. The all-solid-state battery according to claim 1, wherein the laminated film is a resin-laminated metal foil having a resin film on one or both sides of a metal foil.

4. A method for producing the all-solid-state battery according to claim 1, comprising:
housing the all-solid-state battery laminate, having the plurality of all-solid-state unit cells, in a casing composed of the laminated film, each of the all-solid-state unit cells being obtained by laminating the negative electrode current collector layer having the negative electrode current collector tab, the negative electrode active material layer, the solid electrolyte layer, the positive electrode active material layer and the positive electrode current collector layer having the positive electrode current collector tab in this order;
pressing the all-solid-state battery laminate housed in the casing in the direction of lamination from outside the casing;
injecting the injectable filler into the casing while maintaining pressure; and
sealing the casing.

5. The method according to claim 4, wherein the filler is a thermosetting resin, and
wherein the method further comprises curing the injectable filler injected into the casing after injecting the injectable filler into the casing, and before or after sealing the casing.

6. The method according to claim 4, wherein the injectable filler is selected from the group consisting of a two-component curable resin, thermosetting resin and polymer gel.

7. The method according to claim 4, wherein the laminated film is a resin-laminated metal foil having a resin film on one or both sides of a metal foil.

* * * * *